(12) United States Patent
Safi

(10) Patent No.: US 6,480,912 B1
(45) Date of Patent: Nov. 12, 2002

(54) METHOD AND APPARATUS FOR DETERMINING THE NUMBER OF EMPTY MEMORY LOCATIONS IN A FIFO MEMORY DEVICE

(75) Inventor: Roozbeh Safi, Dallas, TX (US)

(73) Assignee: STMicroelectronics, Inc., Carrollton, TX (US)

(*) Notice: Subject to any disclaimer, the term of this patent is extended or adjusted under 35 U.S.C. 154(b) by 38 days.

(21) Appl. No.: 09/621,399

(22) Filed: Jul. 21, 2000

(51) Int. Cl.⁷ .............................................. G06F 12/06
(52) U.S. Cl. ............................. 710/57; 710/53; 710/56
(58) Field of Search ............................. 710/57, 53, 52, 710/56; 711/172, 170; 708/505; 365/189.07

(56) References Cited

U.S. PATENT DOCUMENTS

| | | | |
|---|---|---|---|
| 4,833,651 A | * | 5/1989 | Seltzer et al. .......... 365/189.07 |
| 4,891,788 A | * | 1/1990 | Kreifels ................ 365/189.01 |
| 4,935,719 A | | 6/1990 | McClure |
| 4,942,553 A | | 7/1990 | Dalrymple et al. |
| 5,121,346 A | | 6/1992 | McClure |
| 5,506,809 A | | 4/1996 | Csoppenszky et al. ...... 365/221 |
| 5,765,187 A | | 6/1998 | Shimizu et al. ............. 711/110 |
| 5,978,868 A | | 11/1999 | Maas ........................... 710/52 |
| 6,304,936 B1 | * | 10/2001 | Sherlock ..................... 370/412 |

FOREIGN PATENT DOCUMENTS

| | | |
|---|---|---|
| EP | 0 321 089 | 6/1989 |
| EP | 0 579 375 | 1/1994 |
| EP | 0 752 642 | 1/1997 |

* cited by examiner

Primary Examiner—B. James Peikari
(74) Attorney, Agent, or Firm—Lisa K. Jorgenson; Christopher F. Regan

(57) ABSTRACT

A first-in first-out (FIFO) memory device includes a plurality of memory locations having sequential binary addresses, a write address pointer for sequentially accessing the memory locations to write data therein, and a read address pointer for sequentially accessing the memory locations for reading data therefrom. The method and apparatus add an inverted write binary address of the write address pointer to a read binary address of the read address pointer, add one, and discard the most significant bit (MSB) to define the number of empty memory locations.

33 Claims, 4 Drawing Sheets

METHOD AND APPARATUS FOR DETERMINING THE NUMBER OF EMPTY MEMORY LOCATIONS IN A FIFO MEMORY DEVICE

FIELD OF THE INVENTION

The present invention relates to data memories, and more particularly, to first-in first-out (FIFO) memories.

BACKGROUND OF THE INVENTION

FIFOs (or circular buffers), for example, allow communications between two systems when both systems cannot communicate at the same speed. A FIFO memory has a plurality of serially arranged storage cells (or memory locations) which are sequentially written into and read from. A write address pointer holds the write binary address of the storage cell in which data will be written into during the next write operation, and a read address pointer holds the read binary address of the storage cell which will be read from during the next read operation. For the FIFO memory to operate without creating bit errors, each storage cell must be alternately written into and then read from, i.e., no storage cell is written into twice in succession without an intermediate read operation and no storage cell is read from twice in succession without an intermediate write operation.

To prevent a bit error from occurring, FIFO memories typically detect if the write address pointer and the read address pointer are separated by a predetermined number of storage cells and provide status flags at output terminals which indicate whether the memory is full or empty. It is noted that the write address pointer will always lead the read address pointer since the data cannot be read until it is written. When a particular boundary condition is present, the status flags may disable the reading and/or writing of information to or from the memory.

Conventional approaches for detecting overrun and underrun conditions typically use some type of counting scheme. A counter may be updated dynamically as data is written to or read from the memory. For example, a counter may keep track of the number of unoccupied storage cells in the memory. If the number of occupied storage cells falls to a predetermined value approaching zero, a signal indicating that the memory is "almost empty" is presented. If the number of occupied storage cells becomes large, reaching a predetermined value close to the storage capacity of the memory, a signal indicating that the memory is "almost full" is presented.

An example of a system for generating buffer status flags is disclosed in U.S. Pat. No. 5,978,868 to Maas. The Maas system determines the direction of progression of the read and write pointers by using a gray code counting sequence, comparing the pointers, and using a phase shifter and logic circuit.

However, the read and write pointers of a typical FIFO may wrap around the memory address range. Thus, the logic circuit for determining the number of empty storage cells becomes relatively complex and increases the amount of area required in the integrated circuit. Accordingly, there is a need for a reduced complexity method and circuit for determining the number of empty storage cells in a FIFO memory.

SUMMARY OF THE INVENTION

In view of the foregoing background, it is therefore an object of the invention to provide a determination of the number of empty memory locations with reduced logic and complexity.

This and other objects, features and advantages in accordance with the present invention are provided by a method for determining a number of empty memory locations in a first-in first-out (FIFO) memory device including a plurality of memory locations having sequential binary addresses, a write address pointer for sequentially accessing the memory locations to write data therein, and a read address pointer for sequentially accessing the memory locations for reading data therefrom. The method includes determining a read binary address R of the read address pointer and a write binary address W of the write address pointer, inverting the write binary address W to generate an inverted write binary address $W_{inv}$, and adding $W_{inv}$, R and one to produce a first binary value. The most significant bit (MSB) of the first binary value is discarded to define a second binary value, and the number of empty memory locations is determined based upon the second binary value.

The plurality of memory locations may equal $2^n$, and determining the number of empty memory locations may comprise determining if the second binary value is not zero, and, if so, the number of empty memory locations equals the second binary value. Also, if the second binary value is equal to zero, the number of empty memory locations equals 0 or $2^n$. Here, the method includes distinguishing between a totally full and totally empty condition of the FIFO memory device when the second binary value is equal to zero. This may be done by comparing the MSBs of the read and write address pointers and may include the use of n+1 bit wide counters. Additionally, if the plurality of memory locations equals $2^n$, the read binary address R is an n-bit binary value, the write binary address W is an n-bit binary value, and the second binary value is an n-bit binary value.

Objects, features and advantages in accordance with the present invention are also provided by a first-in first-out (FIFO) memory device including a plurality of memory locations having sequential binary addresses, a write address pointer for sequentially accessing the memory locations to write data therein, and a read address pointer for sequentially accessing the memory locations for reading data therefrom. The FIFO memory device also includes a logic circuit for receiving a read binary address R of the read address pointer and a write binary address W of the write address pointer, inverting the write binary address W to generate an inverted write binary address $W_{inv}$, adding $W_{inv}$, R and one to produce a first binary value, discarding a most significant bit (MSB) of the first binary value to define a second binary value, and outputting the number of empty memory locations based upon the second binary value.

Preferably, the logic circuit includes a logic gate for inverting the write binary address W to generate the inverted write binary address $W_{inv}$, and an adder including a first input connected to the logic gate for receiving the inverted write binary address $W_{inv}$. The adder also includes a second input for receiving the read binary address R, and an output for outputting the number of empty memory locations. The adder may also include a carry-in input for adding the one, and a carry-out output for discarding the MSB of the first binary value.

Again, the plurality of memory locations may equal $2^n$, and the logic circuit outputs the second binary value as the number of empty memory locations when the second binary value is not zero. When the second binary value is equal to zero, the logic circuit outputs 0 as the number of empty memory locations. The FIFO memory device may also include a state device for controlling the read and write address pointers and for distinguishing between a totally full and totally empty condition of the FIFO memory device when the second binary value is equal to zero. Also, a comparing circuit may be included for comparing MSBs of the read and write address pointers and for distinguishing between a totally full and totally empty condition of the FIFO memory device when the second binary value is equal to zero.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
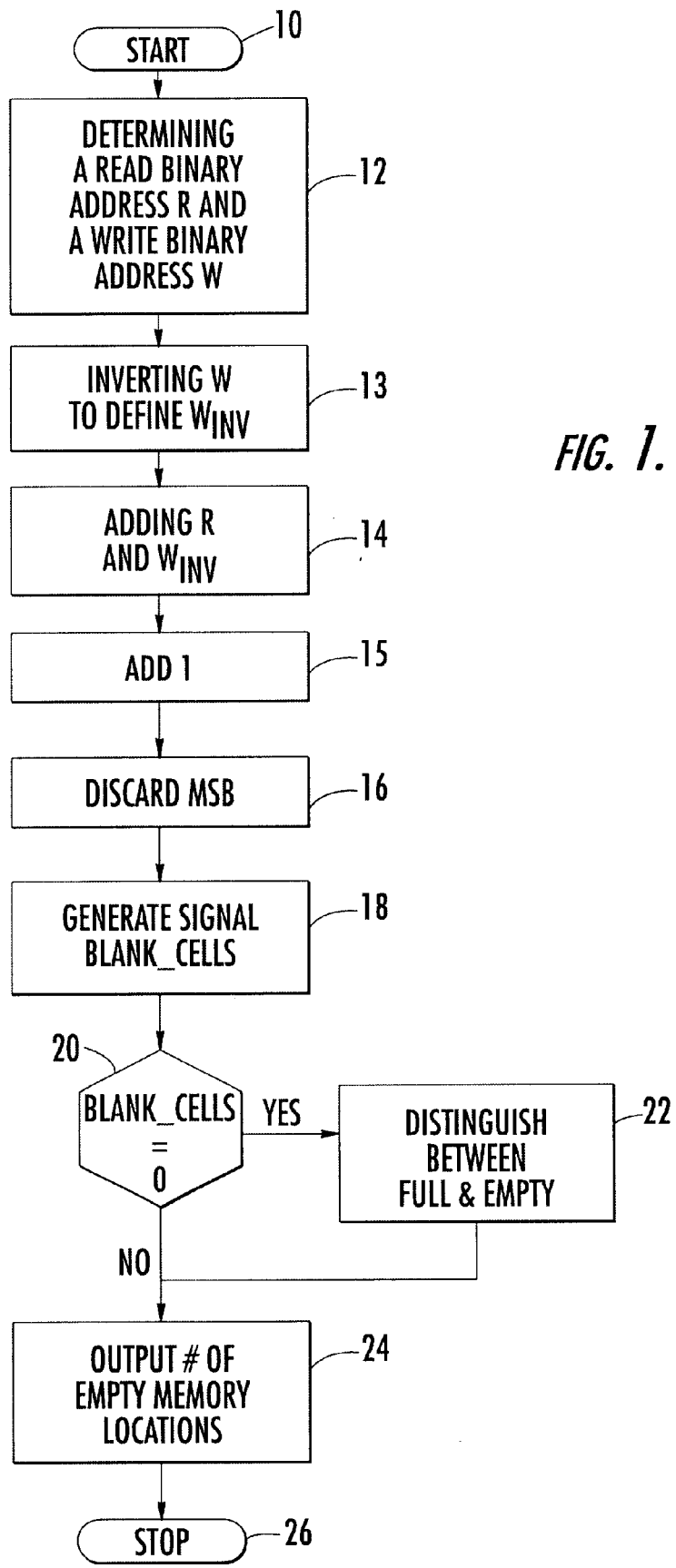
FIG. 1 is a flowchart illustrating the various steps of the method according to the present invention.
Figure 2:
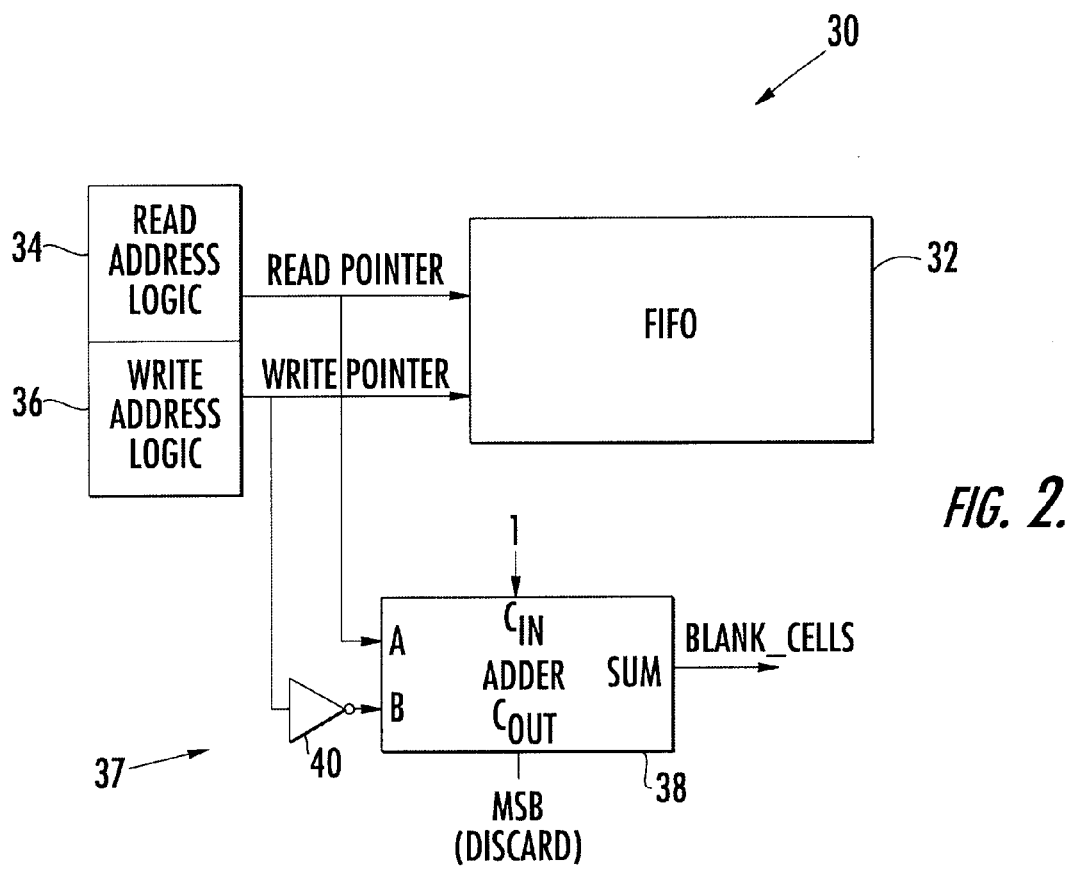
FIG. 2 is a schematic diagram of the FIFO memory device in accordance with the present invention.

Referring initially to FIGS. 1 and 2, the method and device 30 for determining the number of empty memory locations of a FIFO 32 will be described. The FIFO memory device 30 includes a FIFO 32, a read address logic circuit 34 for providing a read address pointer, and a write address logic circuit 36 for providing a write address pointer. The FIFO 32 has a plurality of serially arranged memory locations which are sequentially written into and read from. As discussed above, for the FIFO 32 to operate without creating bit errors, each storage cell must be alternately written into and then read from, i.e., no storage cell is written into twice in succession without an intermediate read operation and no storage cell is read from twice in succession without an intermediate write operation. The write pointer will always lead the read pointer because the data cannot be read until it is written.

For a particular clock cycle, the read address pointer is at a read binary address R of the FIFO 32, and the write address pointer is at a write binary address W of the FIFO. The write binary address W represents the memory location in the FIFO 32 in which data will be written to during the next write operation, and the read binary address W represents the memory location of the FIFO which will be read from during the next read operation, as would be readily appreciated by the skilled artisan.

The device 30 also includes a logic circuit 37 including an adder 38 and an inverter 40. The adder 38 receives the read binary address R of the read address pointer at an input A. The adder 38 receives an inverted write binary address $W_{inv}$ at an input B via the inverter 40 and the write address pointer. The adder also includes a carry-in input Cin, a carry-out output Cout, and an output Sum which will be further described below.

The method begins (block 10) and the read binary address R and the write binary address W are determined at block 12. At block 13, the write binary address W is inverted via inverter 40 to provide the adder 38 with an inverted write binary address $W_{inv}$ at input B. The read binary address is provided to the adder 38 at input A. At block 14, the adder 38 adds the read binary address R and the inverted write binary address $W_{inv}$. At blocks 15 and 16, 1 is added from the carry-in input Cin and the most significant bit (MSB) is discarded via the carry-out Cout output of the adder 38.

At block 18, the adder 38 generates the signal blank_cells at the output Sum representing an initial indication of the number of empty memory locations of the FIFO 32. If blank_cells is equal to 0, then the method (block 20) distinguishes between the FIFO being totally empty and being totally full (blocks 22) as will be described in greater detail below with reference to FIG. 5. Before stopping (block 26), the number of empty memory locations is output at block 24. It is noted that all of the steps of the method (blocks 10–26) described with reference to FIG. 1 are preferably performed within one clock cycle.

While referring to FIGS. 3–5, examples of the determination of the number of empty memory locations of the FIFO 32 will be described. In the examples, the FIFO has 8 memory locations, i.e. it has a depth of $2^n$ where n=3. Thus, the addresses of the memory locations will be n-bit binary addresses or 3-bits within the range of 000–111.

Figure 3:
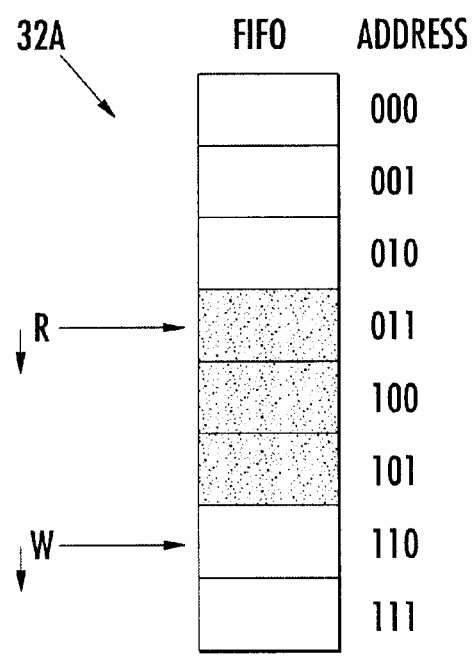
FIGS. 3, 4 and 5 are schematic diagrams of respective examples of the method implemented by the device in accordance with the present invention.

In FIG. 3, the FIFO 32A has the read address pointer at the $4^{th}$ memory location having the 3-bit binary address 011. Thus, the read binary address R=011. The write address pointer is at the $7^{th}$ memory location having the 3-bit binary address 110. Thus, the write binary address W=110 and the inverted write binary address $W_{inv}$=001. Accordingly, the read binary address R, plus the inverted write binary address $W_{inv}$, plus the 1 from the carry-in Cin input of the adder 38 results in R+($W_{inv}$)+1=011+001+001=0101. The MSB is 0 and is discarded via the carry-out Cout output of the adder 38. The signal blank_cells provided at the output Sum of the adder equals a 3-bit binary value of 101 or a decimal value of 5. 5 is the number of empty memory locations of the FIFO 32A as illustrated in FIG. 3.

Figure 4:
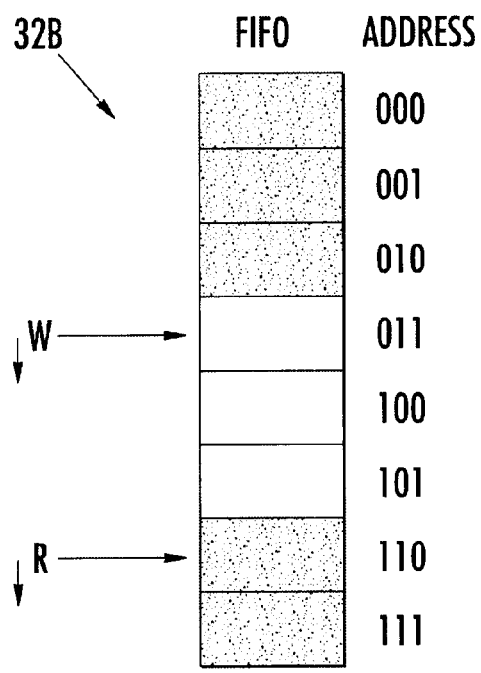

In FIG. 4, the write address pointer has wrapped around the FIFO 32B. The read address pointer is at the $7^{th}$ memory location having the 3-bit binary address 110. Thus, the read binary address R=110. The write address pointer is at the $4^{th}$ memory location having the 3-bit binary address 011. Thus, the write binary address W=011 and the inverted write binary address $W_{inv}$=100. Accordingly, the read binary address R, plus the inverted write binary address $W_{inv}$, plus the 1 from the carry-in Cin input of the adder 38 results in R+($W_{inv}$)+1=110+100+001=1011. The MSB is 1 and is discarded via the carry-out Cout output of the adder 38. The signal blank_cells provided at the output Sum of the adder equals a 3-bit binary value of 011 or a decimal value of 3. 3 is the number of empty memory locations of the FIFO 32B as illustrated in FIG. 4.

Figure 5:
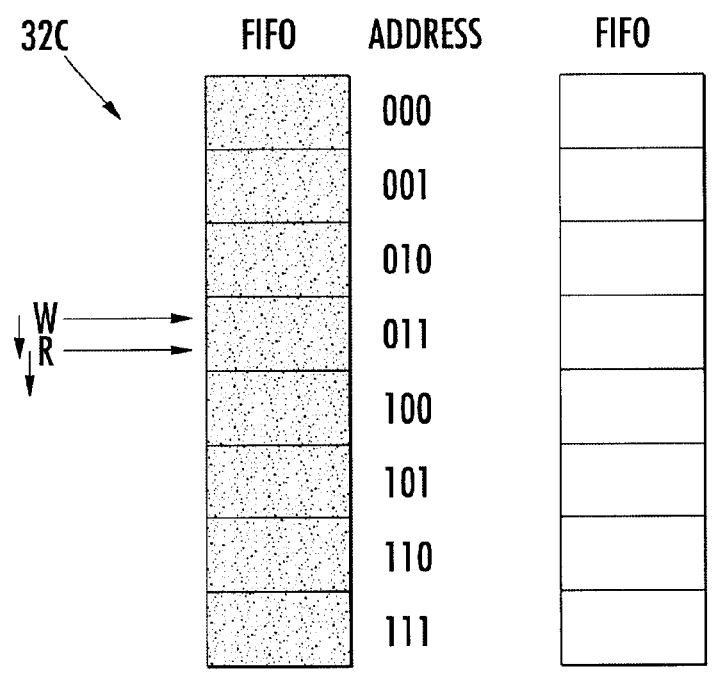

FIG. 5 includes two examples respectively illustrating the FIFO 32C being totally full and the FIFO 32D being totally empty. The write address pointer has wrapped around the FIFO 32C and has caught up with the read address pointer in the totally full example. In the totally empty example, both the read and write address pointers have wrapped around the FIFO 32D and the read address pointer has caught up with the write address pointer. In both examples, the read and write address pointers are at the $4^{th}$ memory location having the 3-bit binary address 011. Thus, the read binary address R=011, the write binary address W=011 and the inverted write binary address $W_{inv}$=100. Accordingly, the read binary address R, plus the inverted write binary address $W_{inv}$, plus the 1 from the carry-in Cin input of the adder 38 results in R+($W_{inv}$)+1=011+100+001=1000. The MSB is 1 and is discarded via the carry-out Cout output of the adder 38. The signal blank_cells provided at the output Sum of the adder equals a 3-bit binary value of 000 or a decimal value of 0.

Figure 6:
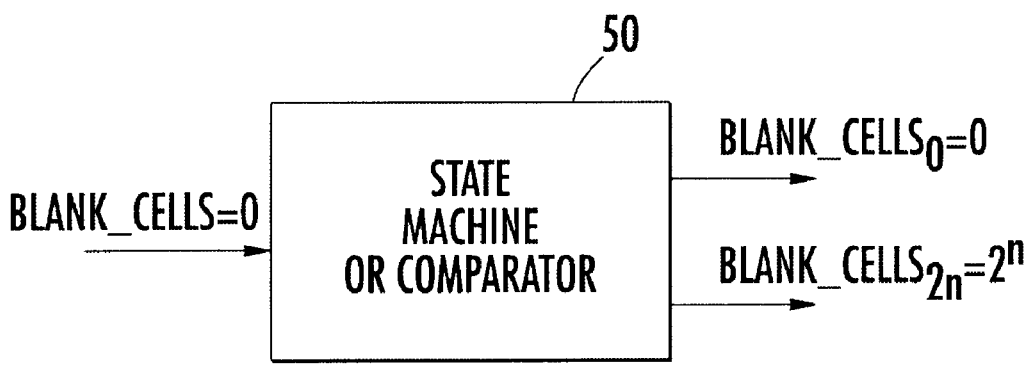
FIG. 6 is a schematic diagram illustrating a device for distinguishing between the totally full and totally empty state of the FIFO.

In both examples, 0 is output as the number of empty memory locations. Therefore, it is necessary to distinguish between the totally full condition and the totally empty condition when the signal blank cells output from the adder equals 0. Thus, referring to FIG. 6, to distinguish between the totally full condition and the totally empty condition, the state machine 50 that controls the read and write pointers or a comparator may be used. If the comparator 50 is used, then the read and write address pointers would each comprise an n+1 bit-wide counter. For example, the MSBs of n+1 bit-wide read and write pointers may be compared to determine if one or both of the pointers has wrapped around the FIFO 32, as would be appreciated by the skilled artisan. If the signal blank_cells equals 0 from the adder 38 and only the write pointer has wrapped around the FIFO 32, then the FIFO is totally full and the number of empty memory locations, indicated by the signal blank_$cells_0$ in FIG. 6, equals 0. If the signal blank_cells equals 0 from the adder 38 and both the write and read pointers have wrapped around the FIFO 32, then the FIFO is totally empty and the number of empty memory locations, indicated by the signal blank_$cells_{2n}$ in FIG. 6, equals $2^n$, or the total number of memory locations in the FIFO.

In the above examples, if R represents the read binary address of the read address pointer, and if W represents the write binary address of the write address pointer, and the FIFO 32 has $2^n$ memory locations, then R and W are both n-bit binary values. Inverting all the bits in W results in $W_{inv}$=$2^n$−W−1. Adding R and $W_{inv}$ and 1 results in R+($W_{inv}$)+1=R+($2^n$−W−1)+1=$2^n$+R−W which is the first binary value. The MSB of the first binary value is discarded to produce the second binary value. Discarding or ignoring the MSB (carry-out) results in one of three different scenarios.

The first case is when the write address pointer has wrapped around the FIFO 32 one more time than the read address pointer. R−W is greater than 0 and the MSB=1. Discarding the MSB produces ($2^n$+R−W)−$2^n$=R−W. The second case is when the read and write address pointers have wrapped around the FIFO an equal number of times. R−W is less than 0 and the MSB=0. Discarding the MSB makes no change and the result is $2^n$+R−W. Thus, the method produces the correct result in both cases with the same logic circuit. Such a logic circuit is simpler, faster, more compact, reliable and cost effective. The third case is when the read and write address pointers have the same binary value. R−W is equal to 0 and the MSB=1. Discarding the MSB results in R−W or 0 as was discussed above with reference to FIGS. 5 and 6.

Accordingly, a method and apparatus have been described for accurately determining the number of empty memory locations of a FIFO 32 with minimal logic and complexity. Various memory status flags may be generated by knowing the number of empty memory locations of the FIFO 32 as would be appreciated by the skilled artisan.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for determining a number of empty memory locations in a first-in first-out (FIFO) memory device including a plurality of memory locations having sequential binary addresses, a write address pointer for sequentially accessing the memory locations to write data therein, and a read address pointer for sequentially accessing the memory locations for reading data therefrom, the method comprising:

determining a read binary address R of the read address pointer and a write binary address W of the write address pointer;

inverting the write binary address W to generate an inverted write binary address $W_{inv}$;

adding $W_{inv}$, R and one to produce a first binary value;

discarding a most significant bit (MSB) of the first binary value to define a second binary value; and determining the number of empty memory locations based upon the second binary value.

2. A method according to claim 1 wherein the plurality of memory locations equals $2^n$, and wherein determining the number of empty memory locations comprises determining if the second binary value is not zero, and, if so, the number of empty memory locations equals the second binary value.

3. A method according to claim 1 wherein the plurality of memory locations equals $2^n$, and wherein determining the number of empty memory locations comprises determining if the second binary value is equal to zero, and, if so, the number of empty memory locations equals 0 for a totally full condition or $2^n$ for a totally empty condition.

4. A method according to claim 3 further comprising distinguishing between the totally full condition and the totally empty condition of the FIFO memory device when the second binary value is equal to zero.

5. A method according to claim 4 wherein distinguishing between the totally full and totally empty conditions comprises comparing the MSBs of the read and write address pointers.

6. A method according to claim 5 wherein the read and write address pointers each comprise an n+1 bit-wide counter.

7. A method according to claim 1 wherein the plurality of memory locations equals $2^n$, the read binary address R is an n-bit binary value, the write binary address W is an n-bit binary value, and the second binary value is an n-bit binary value.

8. A method for determining a number of empty memory locations in a first-in first-out (FIFO) memory device including a plurality of memory locations, and having a write address pointer at a write binary address W, and a read address pointer at a read binary address R, the method comprising:

inverting the write binary address W to generate an inverted write binary address $W_{inv}$;

adding the read binary address R and the inverted write binary address $W_{inv}$; and determining the number of empty memory locations based upon the sum of R and $W_{inv}$.

9. A method according to claim 8 further comprising adding one to the sum of R and $W_{inv}$ to produce a first binary value; wherein determining the number of empty memory locations comprises discarding a most significant bit (MSB) of the first binary value to define a second binary value.

10. A method according to claim 9 wherein the plurality of memory locations equals $2^n$, and wherein determining the number of empty memory locations comprises determining if the second binary value is not zero, and, if so, the number of empty memory locations equals the second binary value.

11. A method according to claim 9 wherein the plurality of memory locations equals $2^n$, and wherein determining the number of empty memory locations comprises determining if the second binary value is equal to zero, and, if so, the number of empty memory locations equals 0 for a totally full condition or $2^n$ for a totally empty condition.

12. A method according to claim 11 further comprising distinguishing between the totally full and totally empty conditions of the FIFO memory device when the second binary value is equal to zero.

13. A method according to claim 12 wherein distinguishing between the totally full and totally empty conditions comprises comparing the MSBs of the read and write address pointers.

14. A method according to claim 13 wherein each of the read and write address pointers comprises an n+1 bit wide counter.

15. A method according to claim 8 wherein the plurality of memory locations equals $2^n$ the read binary address R is an n-bit binary value, the write binary address W is an n-bit binary value, and the second binary value is an n-bit binary value.

16. A first-in first-out (FIFO) memory device comprising:
a plurality of memory locations having a sequential binary addresses;
a write address pointer for sequentially accessing the memory locations to write data therein;
a read address pointer for sequentially accessing the memory locations for reading data therefrom; and
a logic circuit for receiving a read binary address R of the read address pointer and a write binary address W of the write address pointer, inverting the write binary address W to generate an inverted write binary address $W_{inv}$, adding $W_{inv}$ to R, and outputting the number of empty memory locations based upon the sum of $W_{inv}$ and R.

17. A FIFO memory device according to claim 16 wherein the logic circuit comprises:
an inverter for inverting the write binary address W to generate the inverted write binary address $W_{inv}$; and
an adder including
a first input connected to the inverter for receiving the inverted write binary address $W_{inv}$,
a second input for receiving the read binary address R, and
an output for outputting the number of empty memory locations.

18. A FIFO memory device according to claim 17 wherein the adder further includes a carry-in input being used for adding one to the sum of $W_{inv}$ and R to produce a first binary value, and a carry-out output being unused for discarding a most significant bit (MSB) of the first binary value to define a second binary value.

19. A FIFO memory device according to claim 18 wherein the plurality of memory locations equals $2^n$, the read binary address R is an n-bit binary value, the write binary address W is an n-bit binary value, and the second binary value is an n-bit binary value.

20. A FIFO memory device according to claim 18 wherein the plurality of memory locations equals $2^n$, and wherein the logic circuit outputs the second binary value as the number of empty memory locations when the second binary value is not zero.

21. A FIFO memory device according to claim 18 wherein the plurality of memory locations equals $2^n$, and wherein the logic circuit outputs 0 as the number of empty memory locations when the second binary value is equal to zero.

22. A FIFO memory device according to claim 21 further comprising a state device for controlling the read and write address pointers and for distinguishing between a totally full and totally empty condition of the FIFO memory device when the second binary value is equal to zero.

23. A FIFO memory device according to claim 21 further comprising a comparing circuit for comparing MSBs of the read and write address pointers and for distinguishing between a totally full and totally empty condition of the FIFO memory device when the second binary value is equal to zero.

24. A FIFO memory device according to claim 23 wherein each of the read and write address pointers comprises an n+1 bit wide counter.

25. A logic circuit for determining a number of empty memory locations of a first-in first-out (FIFO) memory device comprising a plurality of memory locations, a write address pointer at a write binary address W, and a read address pointer at a read binary address R, the logic circuit comprising:

an inverter for inverting the write binary address W to generate an inverted write binary address $W_{inv}$; and an adder including
- a first input connected to the inverter for receiving the inverted write binary address $W_{inv}$,
- a second input for receiving the read binary address R, and
- an output for outputting the number of empty memory locations.

26. A logic circuit according to claim 25 wherein the adder produces a first binary value by adding $W_{inv}$, R and one, discards a most significant bit (MSB) thereof and to define a second binary value, and outputs the number of empty memory locations based upon the second binary value.

27. A logic circuit according to claim 26 wherein the adder further includes a carry-in input for adding the one, and a carry-out output being unused for discarding the MSB of the first binary value.

28. A logic circuit according to claim 26 wherein the plurality of memory locations equals $2^n$, the read binary address R is an n-bit binary value, the write binary address W is an n-bit binary value, and the second binary value is an n-bit binary value.

29. A logic circuit according to claim 26 wherein the plurality of memory locations equals $2^n$, and wherein the adder outputs the second binary value as the number of empty memory locations if the second binary value is not zero.

30. A logic circuit according to claim 26 wherein the plurality of memory locations equals $2^n$, and wherein the adder outputs 0 as the number of empty memory locations if the second binary value is equal to zero.

31. A logic circuit according to claim 30 further comprising a state device for controlling the read and write address pointers and for distinguishing between a totally full and totally empty condition of the FIFO memory device when the second binary value is equal to zero.

32. A logic circuit according to claim 30 further comprising a comparing circuit for comparing MSBs of the read and write address pointers and for distinguishing between a totally full and totally empty condition of the FIFO memory device when the second binary value is equal to zero.

33. A logic circuit according to claim 32 wherein each of the read and write address pointers comprises an n+1 bit wide counter.

* * * * *